Aug. 22, 1950     L. B. THWAITES     2,519,799
DISTRIBUTOR FOR MANURE OR THE LIKE MATERIAL
Filed March 4, 1946
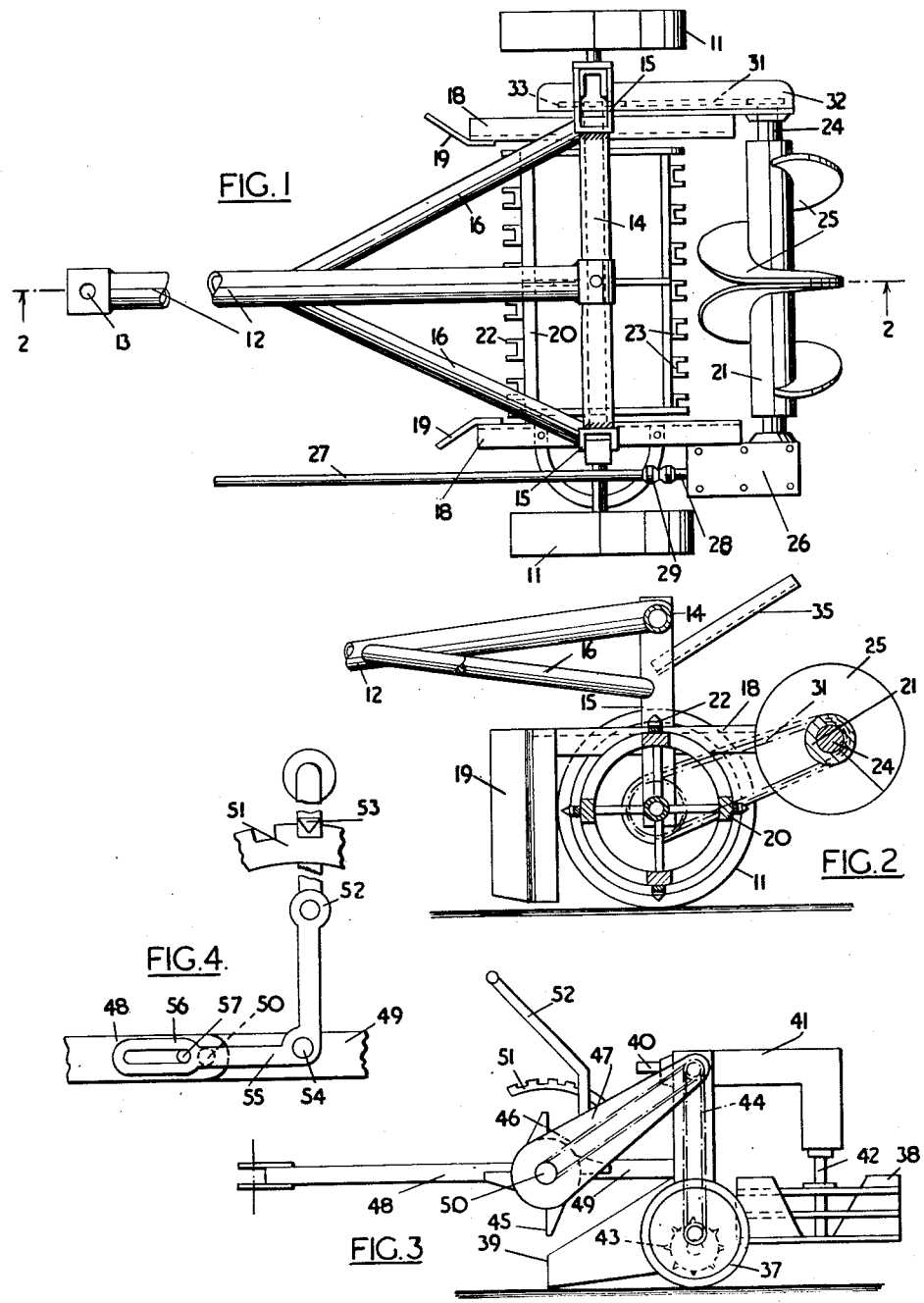
INVENTOR.
*L. B. THWAITES*
BY
Attys.

Patented Aug. 22, 1950

2,519,799

UNITED STATES PATENT OFFICE 2,519,799

DISTRIBUTOR FOR MANURE OR THE LIKE MATERIAL

Leslie Basil Thwaites, Cubbington, near Leamington Spa, England

Application March 4, 1946, Serial No. 651,882
In Great Britain March 10, 1945

9 Claims. (Cl. 275—1)

My main object is to provide a distributor for manure or the like material which has been placed in rows on the land. Each of these rows, which may be substantially parallel to one another, extending across the length or breadth of a field, may be a continuous one. Or the rows may each be discontinuous ones, comprising lines or rows of heaps of the material.

The apparatus of the invention includes a carriage supporting a rotary or other driven spreader, of which there are many known forms, and means for successively transferring the material thereto so that it will be received thereby in a relatively uniform manner while the carriage is being moved along a row. The carriage, it will be understood, may be pulled by a horse or by a tractor, in which case it may be two-wheeled, or it may be self-propelled. In the case of a tractor-drawn carriage or of a self-propelled carriage, the spreader may be driven by means of a power take-off shaft. Alternatively, the spreader may be connected with one or more of the carriage wheels so as to be driven by the rotation thereof.

In a preferred arrangement the transfer of the material from a row to the spreader is by means of a driven spiked roller or the equivalent revolving in the opposite direction to that of the carriage wheels and disposed in advance of the spreader. There may be combined therewith lateral guiding means for directing the material so that it will be treated by the transfer means.

In the case of a discontinuous row, i. e., of a line or row of heaps, the invention further involves a height-adjustable leveller arranged in advance of the tranfer means. This leveller for preference is a spiked roller driven in a direction opposite to that of the carriage wheels and serving also to shred the material. It may, for example, be driven at a speed which is approximately half that of the transfer means when the latter is constituted by a spiked roller or the equivalent.

In the accompanying drawings:

Figure 1 is a plan view of one form of distributor, according to the invention, adapted for use with a contanuous row of manure or the like material;

Figure 2 is a sectional elevation thereof taken on the line 2—2 of Figure 1;

Figure 3 is an elevation to a smaller scale, of another form of distributor, according to the invention, for use with discontinuous rows, i. e., with lines or rows of heaps of material; and Figure 4 is a diagrammatic fragmentary view to a larger scale, illustrating how the leveller of Figure 3 may be adjusted for height.

The carriage shown in Figures 1 and 2 has two land wheels 11 which are freely rotatable with respect to a frame which may take any convenient form. As shown, the frame includes a central chassis longitudinal 12 adapted at its leading end 13 to be attached to a tractor, a main transverse frame member 14, two upright frame members 15, and stays 16, all these parts being conveniently welded to one another. The wheels 11 may be supported from the upright frame members 15, as is common with this type of machine, for vertical adjustment with respect thereto.

In the present instance the frame also includes two side members 18, 18 which carry guides 19 at their front ends to direct the material, over which the apparatus is being pulled, laterally into contact with a rotary spiked roller 20 serving for picking up the material and for transferring it to the spreader 21. The roller 20 has, for example, eight longitudinal rows of spikes or tines 22 which, as shown, may be arranged in pairs, their bases 23 being bolted to the surface of the roller, and preferably the tines are arranged so as to be uniformly distributed over the face of the roller. At their rear ends, the side members 18 support the spindle 24 of the spreader, which is shown by way of example as being comprised of two oppositely-arranged screws 25.

The spreader spindle 24 is driven by means of gearing, which may be of any convenient kind, contained within the casing 26 fast with the tail end of one of the side members 18. 27 represents part of a power take-off shaft (to be driven in the usual manner from the tractor) which is connected with the input shaft 28 of the gearing through a universal joint 29.

The free end of the spindle 24 carries a chain sprocket connected by a chain 31, within a casing 32, to a chain sprocket 33 which is fast with the spindle of the drum 20. The arrangement is such that both the drum 20 and the spreader 21 revolve in a direction opposite to that in which the land wheels 11 rotate when the apparatus is being pulled forwardly by the tractor. The gearing is such as to give appropriate speeds both to the spiked roller 20 and to the spreader 21. For example, the spiked roller may be revolved at a speed of approximately 160 R. P. M., (revolutions per minute), and the spreader at a speed of approximately 530 R. P. M.

In use, when the apparatus is being drawn along a continuous row of manure, the revolving spiked roller 29 picks this up and throws it rearwardly on to the spreader, which spreads it laterally in a relatively uniform manner. There are many different forms which the spreader may take.

As will be apparent to those skilled in the art, it is advantageous to mount a baffle board 35 (omitted from Figure 1 for the sake of simplicity) forwardly of and above the spreader to prevent the manure from being flung forwardly, and to direct such manure back to the spreader.

In the construction of Figures 3 and 4, there is again a framework adapted to be pulled by a tractor, a pair of land wheels 37, a spreader 38, which, in this case, is shown as being of the centrifugal kind, lateral guides 39, and a power take-off shaft a portion of which is shown at 40. The latter drives, through gearing within a casing 41, the shaft 42 of the spreader, the casing being centrally arranged and constituting part of the framework. The power take-off shaft 40 also drives the spiked roller 43, which serves for transferring the manure or the like from the ground to the spreader 38, by means of a chain 44.

In the present instance there is also provided a leveller consisting of a spiked roller 45 which is driven by a chain 46 enclosed within a casing 47 (forming part of the framework), the leveller being in advance of the spiked roller 43. It can be adjusted for height so as to push forward, and thus level, the upper parts of heaps of manure when passing over them, thereby converting them into a continuous or substantially discontinuous row of manure. It is driven more slowly than the spiked roller 43 (for example, at a speed of about 90 R. P. M.) but in the same direction, and it serves also for shredding the manure.

The particular means for adjusting the spiked roller 45 for height in the present example are shown as comprising two portions 48, 49 of the central chassis longitudinal which are hinged to one another at 50, this corresponding with the axis of the leveller 45, a toothed quadrant 51 fast with the portion 49, and a lever 52 having a spring-pressed pawl 53 of a known kind to coact with the notches of the quadrant 51, the lever being pivotally mounted at 54 on the frame member 49. The limb 55 of the lever has a slot, as shown at 56, and engaged with the slot is a pin 57 fast with the frame member 48.

Thus the release of the detent 53 and movement of the lever with respect to the quadrant about the pivot 54 will act to vary the inclination of the members 48 and 49 with respect to one another, i. e., to tilt the member 49 from the horizontal position in which it is shown in Figure 3; and in this way the spiked roller 45 can be lowered, the spreader 38 being correspondingly raised, as this portion of the apparatus tilts as a whole about the axis of the land wheels 37. Conversely, movement of the lever 52 in the other direction will raise the spiked roller 45 and lower the spreader.

What I claim as my invention and desire to secure by Letters Patent of the United States is:

1. A distributor, for material such as manure which has been placed in rows of heaps on the land, including a wheeled carriage adapted to be drawn along a row of heaps, a rotary spreader carried by the carriage at the rear end thereof, means for rotating the spreader, means carried by the carriage in advance of the spreader for levelling the heaps to form a substantially continuous row while the carriage is being moved along a row, means for adjusting the levelling means relatively to the land, and means carried by the carriage between the spreader and the levelling means for transferring the levelled material to the spreader so that it will be received thereby in a substantially uniform manner while the carriage is being moved along a row.

2. A distributor, for material such as manure which has been placed in rows of heaps on the land, including a wheeled carriage adapted to be drawn along a row of heaps, a power shaft, a spreader carried by the carriage at the rear end thereof, means for driving the spreader from the power shaft, a laterally-extending spiked roller carried by the carriage in advance of the spreader for levelling the heaps to form a substantially continuous row while the carriage is being moved along a row, means for adjusting the spiked roller relatively to the land, another laterally-extending spiked roller carried by the carriage between the spreader and the first-mentioned roller for transferring the levelled material to the spreader so that it will be received thereby in a substantially uniform manner while the carriage is being moved along a row, and means for driving both the rollers from the power shaft in the opposite direction to that in which the carriage wheels normally revolve.

3. A distributor for material such as manure which has been placed in rows on the land comprising a wheeled carriage adapted to be drawn along a row over the material to be distributed by a tractive device, a spreader carried by said carriage at the rear thereof, driving means carried by said carriage for actuating said spreader, material leveling and transferring means carried by said carriage in advance of said spreader, and driving means for driving said material leveling and transferring means in a direction opposite to that in which the carriage wheels are revolved so that the material leveling and transferring means will transfer the material to the spreader in a substantially uniform manner while the carriage is being moved along a row.

4. A distributor for material such as manure as claimed in claim 3 wherein lateral guiding means are carried by the carriage at each side thereof in advance of said material leveling and transferring means for directing the material into position to be received and transferred by said leveling and transferring means.

5. A distributor for material such as manure which has been placed in rows of heaps on the land, comprising a wheeled carriage having a pivoted sectionalized central chassis adapted to be drawn along a row of heaps, a rotary spreader carried by the carriage at the rear end thereof, driving means carried by said carriage for rotating said spreader, material leveling and shredding means carried by the carriage in advance of the spreader for leveling the heaps to form a substantially continuous row while the carriage is being moved along a row, a toothed quadrant carried by the rear portion of said pivoted sectionalized central chassis, an L-shaped lever arm pivoted to the rear section of said chassis at the junction of its leg and foot members, and having a longitudinal slot in the foot member, a pin carried by the forward section of said sectionalized chassis receivable and guided in said longitudinal slot of said foot member in advance of the pivot joining said sectionalized chassis, said lever having a spring biased pawl adapted to seat between the teeth of said quadrant, said lever provided for adjusting said leveling and shredding means relatively to the land, and spreading and transferring means carried by said carriage between said leveling and shredding means and said spreader and being coaxial with the wheels of the carriage for transferring the leveled material to the spreader so that it will be received thereby in a substantially uniform manner while the carriage is being moved along a row.

6. A distributor for material such as manure as claimed in claim 5 characterized by the fact that both said material leveling and shredding means and said spreading and transferring means are spiked rollers.

7. A distributor for material such as manure which has been placed in rows on the land comprising a wheeled carriage adapted to be drawn along a row over the material to be distributed by a tractive device, a spiked roller carried by said carriage coaxial with said wheels for leveling and transferring the material along the row, driving means for driving the spiked roller in a direction opposite to that in which the carriage wheels are revolved, a spreader carried by said carriage at the rear thereof, driving means carried by said carriage for actuating said spreader, and means connected to the source of tractive power at one end and connected to said spreader at its other end for driving said spdeader and for imparting rotation to said spiked roller and driving the same in a direction opposite to that in which the carriage wheels are revolved so that the spiked roller will transfer the material to the spreader in a substantially uniform manner while the carriage is being moved along a row.

8. A device of the character described as claimed in claim 7 wherein said spreader is a roller having two opposed helical baffles carried thereby.

9. A device as claimed in claim 8 further comprising material guides carried by the sides of the vehicle frame for directing the material to be spread into the path of the spiked roller and a baffle plate carried by the carriage frame so positioned as to direct the material thrown from the spiked roller on to the spreader.

LESLIE BASIL THWAITES.

REFERENCES CITED

The following references are of record in the file of this patent:

UNITED STATES PATENTS

| Number | Name | Date |
|---|---|---|
| Re. 19,801 | Mosgrove | Dec. 31, 1935 |
| 361,543 | Pegues | Apr. 19, 1887 |
| 648,152 | Loessner | Apr. 24, 1900 |
| 1,117,314 | Blunck | Nov. 17, 1914 |
| 1,240,542 | Cassell | Sept. 18, 1917 |
| 1,445,265 | Bohmker | Feb. 13, 1923 |
| 1,945,125 | Swanson et al. | Jan. 30, 1934 |
| 1,979,945 | Kranick | Nov. 6, 1934 |
| 2,007,646 | Gilbertson | July 9, 1935 |
| 2,239,448 | Selhorst | Apr. 22, 1941 |
| 2,256,593 | Hill | Sept. 23, 1941 |
| 2,312,164 | Holzbock | Feb. 23, 1943 |

FOREIGN PATENTS

| Number | Country | Date |
|---|---|---|
| 401,879 | Germany | Sept. 13, 1924 |
| 592,988 | Great Britain | Oct. 6, 1947 |